United States Patent [19]

Knuchel

[11] 4,190,146

[45] Feb. 26, 1980

[54] APPARATUS FOR CONVEYING FRAGILE ITEMS

[75] Inventor: Max Kuchel, Gächlingen, Switzerland

[73] Assignee: SIG-Schweizerische Industrie-Gesellschaft, Neuhausen am Rheinfall, Switzerland

[21] Appl. No.: 922,302

[22] Filed: Jul. 6, 1978

[30] Foreign Application Priority Data

Jul. 13, 1977 [CH] Switzerland .......................... 8690/77

[51] Int. Cl.$^2$ ............................................. B65G 47/31
[52] U.S. Cl. ..................................... 198/460; 198/461
[58] Field of Search ............... 198/460, 461, 579, 462, 198/572, 577, 575

[56] References Cited

U.S. PATENT DOCUMENTS

| | | | |
|---|---|---|---|
| 2,662,633 | 12/1953 | Kingsley | 198/461 X |
| 3,155,221 | 11/1964 | Griner | 198/461 X |
| 3,251,452 | 5/1966 | Conway et al. | 198/460 |
| 3,944,049 | 3/1976 | Graybill | 198/460 |

Primary Examiner—James L. Rowland
Attorney, Agent, or Firm—Spencer & Kaye

[57] ABSTRACT

Apparatus for reducing the accumulation pressure between succeeding items being conveyed in succession along an accumulation path to a receiving device, composed of a device for controlling the advance of items along the accumulation path in a manner to produce gaps between successive items in the conveying direction along the accumulation path, and a sensing unit disposed for monitoring the length of each gap and connected to the control device for causing the rate of supply of items to the outlet end of the accumulation path to be higher than the rate at which items are being conveyed from the accumulation path to the receiving device for a selected time period following each occurrence of a gap length exceeding a selected value, and to be lower than the rate at which items are being conveyed from the accumulation path to the receiving device at all other times, whereby a cyclic variation in gap length is produced between successive gaps.

10 Claims, 5 Drawing Figures

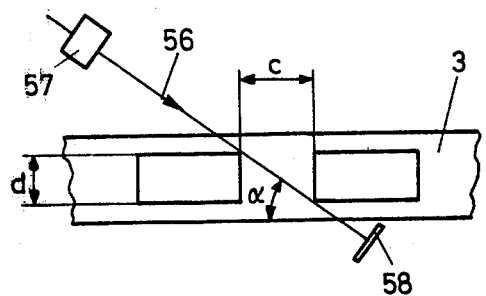
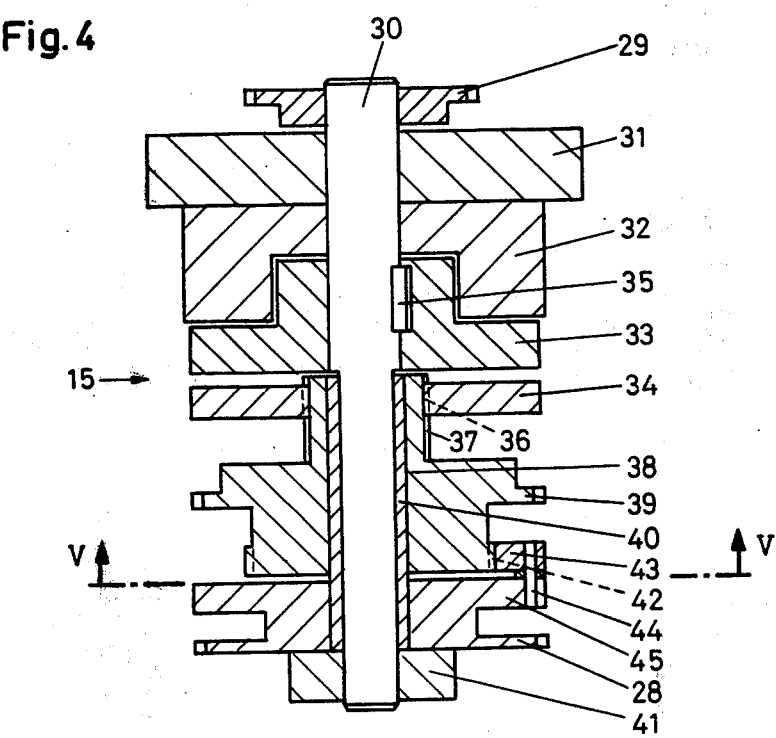
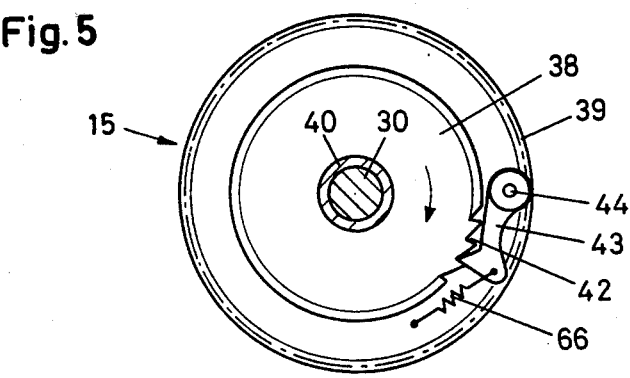

APPARATUS FOR CONVEYING FRAGILE ITEMS

BACKGROUND OF THE INVENTION

The present invention relates to systems for conveying individual fragile items, such as cookies or chocolate bars, to packaging machines or other receiving devices, and relates particularly to systems in which a certain accumulation of items must occur ahead of the input to the receiving device. When supplying items, e.g. cookies or chocolate bars, to a packaging machine or other receiving device, the items must be permitted to accumulate in front of the receiving device so as to compensate for output fluctuations in the output of the source furnishing the items. The higher the output, or item handling rate, of the receiving device, the longer must be the accumulation path upstream of it. However, an increase in the length of the accumulation path is accompanied by an increase in the accumulation pressure experienced by items on the path, which may result in damage to the items or even jamming of the items at some point on the path, and thus interruption of the work sequence.

SUMMARY OF THE INVENTION

It is an object of the present invention to overcome these drawbacks.

A more specific object of the invention is to reduce the accumulation pressure on such an accumulation path of successively conveyed items.

These and other objects are achieved, according to the invention, by providing apparatus which reduces the accumulation pressure along such an accumulation path, composed of means which produce, between successive items on the accumulation path, gaps which alternatingly increase and decrease in length and at least one sensor which responds to the lengths of the gaps and which controls the above-mentioned means when it senses a predetermined maximum gap length size so as to provide more items to the output end of the accumulation path during a time interval than are being discharged from that output end, while during the remaining time it feeds fewer items to this portion of the accumulation path than are discharged therefrom.

BRIEF DESCRIPTION OF THE DRAWING

FIG. 3 is a detail plan view of a single light barrier device forming part of an apparatus according to the invention.

FIG. 4 is a cross-sectional view of a coupling device forming part of an apparatus according to the invention.

FIG. 5 is a cross-sectional view taken along the line V—V of FIG. 4.

DESCRIPTION OF THE PREFERRED EMBODIMENTS

Figure 1:
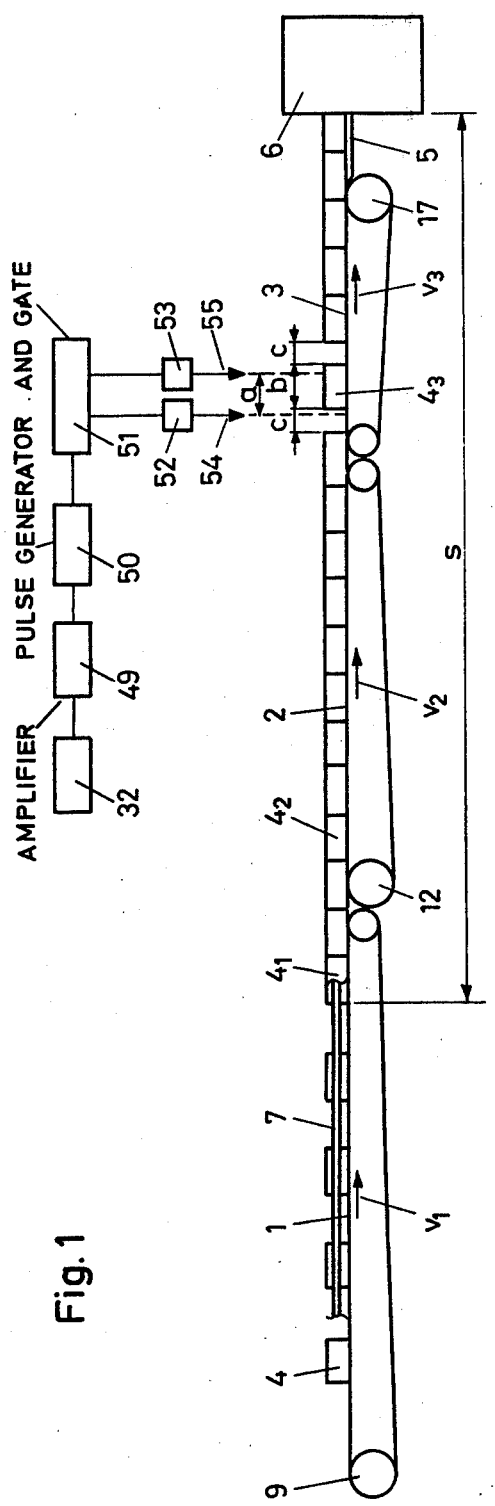
FIG. 1 is a simplified side elevational view of a preferred embodiment of an accumulation pressure reducing apparatus according to the invention.
Figure 2:
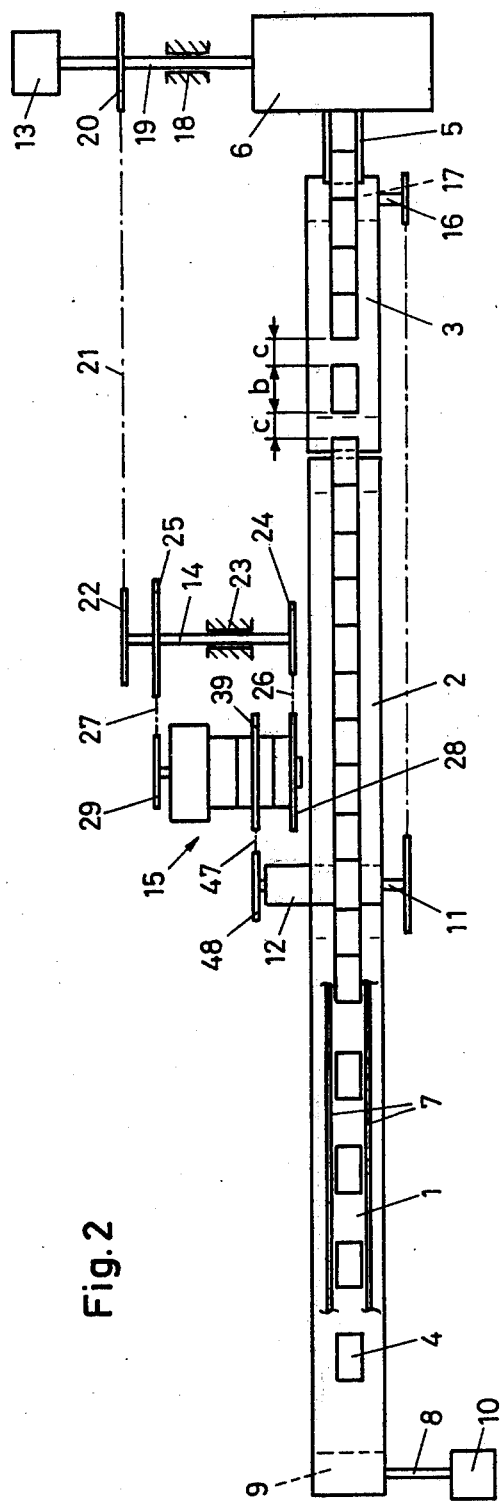
FIG. 2 is a top plan view of the embodiment of FIG. 1.

Referring initially to FIGS. 1 and 2, the illustrated device includes three aligned endless belts 1, 2 and 3 defining a conveying path for a series of items 4, e.g. pieces of chocolate, which are fed by these belts onto a plate or platform 5 and into a recieving device 6. Device 6 can typically be a packaging machine or an apparatus which individually places the chocolate pieces onto successive members of a transporting chain. The objects 4 are centered on belts 1, 2 and 3 by means of lateral guides 7 which are shown only for part of belt 1 in order to simplify the drawing.

Belt 1 is guided around two rollers, the rear one of which is a drive roller 9 having a shaft 8 which is driven by a motor 10. Similarly, belt 2 has a drive roller 12 whose shaft 11 is driven by a motor 13 via motor shaft 19, a transmission shaft 14 and a coupling device 15. Belt 3 is provided with a drive roller 17 whose shaft 16 is driven by shaft 11 via associated sprocket wheels and a chain, those sprocket wheels being so dimensioned that belt 3 always advances at a higher speed than belt 2. Shaft 19 of motor 13 is mounted in a bearing 18 and also drives the receiving device 6.

Shaft 19 carries a sprocket wheel 20 which is connected by a chain 21 with a sprocket wheel 22 secured on the transmission shaft 14. Shaft 14 is mounted in a bearing 23 and is additionally provided with two sprocket wheels 24 and 25 which drive two sprocket wheels 28 and 29 of the clutch 15 via respective chains 26 and 27. Wheels 24 and 25 have respectively different diameters, as do wheels 28 and 29. The transmission ratio of chain wheels 24, 28 and 25, 29 is selected so that wheel 28 rotates at a lower angular rate than does wheel 29.

As is shown in FIGS. 4 and 5, the coupling device 15 includes a shaft 30 which is mounted in a bearing 31 and is provided at one end with the sprocket wheel 29. The electromagnet 32, not shown in detail, of an electromagnetic clutch is permanently connected to bearing 31 and the clutch is provided with two coupling discs 33 and 34. Disc 33 is fixed to shaft 30 by means of a key 35 and thus rotates continuously with wheels 29. The inner periphery of disc 34 is provided with teeth 36 which engage in a ring of axially extending teeth 37 provided at the hub 38 of a sprocket wheel 39. Disc 34 is movable axially relative to hub 38 while teeth 36 and 37 remain in engagement. The sprocket wheels 39 and 28 are rotatable on a sleeve 40 which surrounds a section of shaft 30 and are held on shaft 30 by a ring 41 fastened to the respective end of shaft 30.

A second ring of teeth 42 is provided on the hub 38 of sprocket wheel 39 to cooperate with a pawl 43 which is pivotally mounted on a pin 44 fastened in a hub portion 45 of sprocket wheel 28. A spring 66 engaging at this hub portion 45 urges pawl 43 into engagement with the ring of teeth 42. Teeth 42 are shaped and pawl 43 is arranged to permit hub 38 to rotate relative to wheel 28 only in the direction of the arrow in FIG. 5.

If the electromagnet 32 is energized, the coupling disc 34 engages coupling disc 33 and carries hub 38 along during its rotation at the angular speed T' of the shaft 30 which is driven by sprocket wheel 29. This speed T' is higher than that of sprocket wheel 28 whose hub member 45 carries along pawl 43 so that the latter will not block, and sprocket wheel 39 therefore rotates at speed T'. If, however, the coupling disc 33 is not retained, i.e., the electromagnet is deenergized as shown in FIG. 4, the sprocket wheel 39 is driven not by shaft 30 but by sprocket wheel 28 via pawl 43 and teeth 42 so that its angular speed T" will then be less T'. As shown in FIG. 2, sprocket wheel 39 drives shaft 11 via a chain 47 and a sprocket wheel 48 fixed to shaft 11.

Referring to FIG. 1, in order to actuate the electromagnetic clutch 32–34 an output current from an amplifier 49 is fed to the electromagnet 32. The amplifier 49 has its input connected to a pulse generator 50 which is controlled by an AND circuit 51. The AND circuit 51 is connected to the outputs of two light sensors 52 and 53, each including, in a known manner, a light emitter and a light receiver, so as to establish respective light barriers 54 and 55 which are perpendicular to belt 3 and are spaced apart by a distance "a" in the conveying direction, distance "a" being less than the length "b" of each item 4 in the conveying direction. The belt 3 serves as a reflector for the light beam defining each barrier unless it is covered by an item 4.

The above-described apparatus operates as follows:

On the belt 1 which moves at a relatively high, constant speed $v_1$ and has a relatively low coefficient of friction $\mu_1$ with respect to items 4, the items are spaced at random, more or less irregular distances from one another. Belt 2 moves either at a speed $v_2'$ or at a speed $v_2''$ depending on whether sprocket wheel 39 is rotating at the lower speed T' or at the higher speed T''. However, both $v_2'$ and $v_2''$ are much slower than $v_1$. In addition, the coefficient of friction $\mu_2$ of belt 2 is much greater than $\mu_1$. Therefore, items $4_1$ accumulate at the output end of belt 1 against the items $4_2$ frictionally engaging belt 2.

From belt 2 the items 4 move to belt 3 whose speed $v_3''$ or $v_3'''$ respectively, is proportionally greater than $v_2'$ or $v_2''$, respectively, due to the speed ratio established between shafts 11 and 16. The coefficient of friction $\mu_3$ of belt 3 is relatively low. At the point of transfer between belts 2 and 3 there thus occur gaps c between the items 4 which again accumulate at the output end of belt 3.

If the belt 2 travels at its slower speed $v_2''$ it furnishes items 4 to belt 3 at a rate somewhat lower than the rate of acceptance of receiving device 6 so that gaps $c_1$ whose size and position change of course with the arrival of each further item $4_3$, become successively larger. In the illustrated position of item $4_3$, light barrier 54 is not broken but light barrier 55 is. Since accordingly only light sensor 52 to AND circuit 51 furnishes a signal, the latter does not emit an output signal.

Finally, however, gaps c become so large that one of them becomes greater than a and unblocks both light barriers 54 and 55. The AND circuit 51 then receives signals at both of its inputs simultaneously and thus excites pulse generator 50. The latter now furnishes a short pulse to amplifier 49 so as to excite the electromagnet 32. Thus, during a short interval t, clutch 32-34 is engaged to rotate wheel 39 at the higher speed T'', and to advance belt 2 at the higher speed $v_2''$. This interval t is given a selected duration so that many items 4 reach belt 3 to cause gaps c to become smaller again, and the entire procedure is then repeated.

In FIG. 1, items 4 accumulate over an accumulation path s. Gaps c have now been created in the succession of items on this accumulation path so as to prevent too high a buildup and with it the danger of jamming of items 4 between guides 7. The accumulation pressure at both the beginning and end of the accumulation path is practically disappearingly low but, were it not for gaps c, could reach values along path s which could result in damage to fine chocolate cookies or the like. On the other hand, as mentioned above, the accumulation path must have a certain length to compensate for irregularities in supply or to assure continuous feeding of the receiving device 6 and the length of this path is made greater as the output of the receiving device increases.

In a practical embodiment of the invention for an output of 600 items per minute the following operating parameters can be used:

| | |
|---|---|
| Speed of belt 1 | $v_1$ = 48 m/min |
| Speed of belt 2 | $v_2'$ = 23.7 m/min |
| | $v_2''$ = 26.7 m/min |
| Speed of belt 3 | $v_3'$ = 32.7 m/min |
| | $v_3''$ = 37 m/min |
| Distance between light barriers | a = 20 mm |
| Length of the items | b = 42 ± 2 mm |
| Order of magnitude of the coefficients of friction relative to the items | $\mu_1$ = 0.1 |
| | $\mu_2$ = 0.2 |
| | $\mu_3$ = 0.1 |
| Pulse duration | t = 0.4 sec. |

The above assumes that the speed of the receiving device 6 or the speed of motor 13 essentially corresponds to the output of the source supplying items 4 to belt 1. In order to assure this, it will be necessary in most cases to provide a means for controlling this speed according to techniques already well known in the art.

FIG. 3 shows an embodiment of the invention in which AND circuit 51 is eliminated and only one light barrier 56 is provided by a light sensor 57, containing a light emitter and a light receiver, and a mirror 58. The light barrier 56 extends horizontally at a slight distance above belt 3 and at an acute angle $\alpha$ to the longitudinal direction of the belt. In the illustrated position of gap c, the light barrier 56 is just unblocked, i.e., does not intersect any of the items 4 defining this gap c, so that the light sensor 57 emits a signal directly to pulse generator 50 and belt 2 is switched to its higher speed $v_2''$ for the selected time interval t. In this case the critical value for c is d . ctn $\alpha$, where "d" is the width of an item. If c is only slightly less than d . ctn $\alpha$, the light barrier 56 will be broken by one of the two diagonally opposite corners of respective objects 4 and belt 2 will continue to move at speed $v_2'$ until the gap again becomes large enough that such is no longer the case.

This embodiment has the advantage that the gap c may be made relatively large, even greater than the length b of items 4, which reduces the number of switchings and results in less contact wear. Moreover, one of the light sensors and the AND circuit 51 of FIG. 1 are not required. Somewhat of a drawback, however, is the fact that the guides 7 must be briefly interrupted in the area of the light barrier 56 and that the accuracy of the measurement of gap c is reduced, particularly if the items have rounded corners.

It is of course not necessary for transmitter and receiver of each of the light sensors 52, 53 and 57 to be disposed at the same location, or for the beam to be reflected by 180° by belt 3 or mirror 58 so that the reflected beam coincides with the impinging beam. In fact, it has been found that in practice it may be more advantageous for installation reasons if, in the case of the embodiment of FIG. 1, the transmitter and receiver of sensors 52 and 53 are a bit offset from one another in the longitudinal direction of belt 3 so that the impinging beam and the reflected beam are somewhat inclined with respect to the horizontal and the height of the objects 4 has a certain shadow effect.

In practice, distance "a" between the light barriers 54 and 55, or the angle $\alpha$ of the light barrier 56, will always be made adjustable so as to adapt the device to various sizes and formats of items 4 as well as to the output of the receiving device 6. In this respect it is of advantage if sprocket wheels 20, 24 and 29 and those on shaft 11 can be easily replaced.

It will be understood that the above description of the present invention is susceptible to various modifications, changes and adaptations, and the same are intended to be comprehended within the meaning and range of equivalents of the appended claims.

What is claimed is:

1. Apparatus for reducing the accumulation pressure between succeeding items being conveyed in succession along an accumulation path to a receiving device, comprising: first, second and third conveyor belts disposed in succession to define a conveying path, at least a portion of which conveying path constitutes the accumulation path; means connected to control the advance of items along the accumulation path in a manner to produce gaps between successive items in the conveying direction along the accumulation path; and sensing means disposed for monitoring the length of each gap and connected to said control means for causing the rate of supply of items to the outlet end of the accumulation path to be higher than the rate at which items are being conveyed from the accumulation path to the receiving device for a selected time period following each occurrence of a gap length exceeding a selected value, and to be lower than the rate at which items are being conveyed from the accumulation path to the receiving device at all other times, whereby a cyclic variation in gap length is produced between successive gaps; and wherein said first belt defines the upstream portion of said conveying path and is advanced at a constant speed, said second belt is disposed downstream of said first belt and is connected to be controlled by said control means to advance at a first speed during each selected time period and at a second speed lower than the first speed at all other times, both the first speed and the second speed being lower than the speed of advance of said first belt, and said third belt is disposed downstream of said second belt and is driven to advance at a speed proportional to, but higher than, the current advance speed of said second belt.

2. An arrangement as defined in claim 1 wherein: said sensing means comprise means defining two light barriers disposed above said third belt and spaced apart in the conveying direction, each barrier having a light beam arranged to intersect the conveying path, to be reflected by said third belt and to be interrupted by impingement on an item, each light barrier producing an output signal whenever its associated beam is not being interrupted; and said control means comprise an AND circuit connected to said light barriers for producing an excitation signal upon simultaneous production of output signals by both of said light barriers, a pulse generator connected to said AND circuit for producing an output pulse having a duration equal to the selected time period in response to the appearance of each excitation signal from said AND circuit, clutch means connected to said second belt and movable into a first position in response to each output pulse from said generator for advancing said second belt at its first speed during the period of each output pulse and movable into a second position after each output pulse for advancing said second belt at its second speed.

3. An arrangement as defined in claim 2 wherein said means defining light barriers are adjustably positioned for varying the selected gap length value.

4. An arrangement as defined in claim 1 wherein said sensing means comprise means defining a light barrier composed of a light emitter and light receiver located at one side of said third belt and a mirror located at the other side of said third belt for reflecting a light beam from said emitter to said receiver across said third belt at a level such that the beam will be interrupted by each item moving therepast, said emitter, receiver and mirror being positioned for causing the light beam to extend at an acute angle to the longitudinal direction of said third belt, said light barrier producing an output signal whenever its associated beam is not being interrupted; and said control means comprise a pulse generator connected to said receiver for producing an output pulse having a duration equals to the selected time period in response to each appearance of an output signal from said receiver, and clutch means connected to said second belt and movable into a first position in response to each output pulse from said generator for advancing said second belt at its first speed during the period of each output pulse and movable into a second position after each output pulse for advancing said second belt at its second speed.

5. An arrangement as defined in claim 4 wherein said means defining a light barrier are adjustably positioned for varying the selected gap length value.

6. An arrangement as defined in claim 1 wherein the coefficient of friction, with respect to the items, of said second belt is higher than those of said first and third belts.

7. Apparatus for reducing the accumulation pressure between succeeding items being conveyed in succession along an accumulation path to a receiving device, comprising: first and second transport means disposed in succession in a conveying path, and constituting the accumulation path; means connected to control the advance of items along the accumulation path in a manner to produce gaps between successive items in the conveying direction along the accumulation path; and sensing means disposed for monitoring the length of each gap and connected to said control means for causing the rate of supply of items to the outlet end of the accumulation path to be higher than the rate at which items are being conveyed from the accumulation path to the receiving device for a selected time period following each occurrence of a gap length exceeding a selected value, and to be lower than the rate at which items are being conveyed from the accumulation path to the receiving device at all other times, whereby a cyclic variation in gap length is produced between successive gaps; and wherein said first transporting means is connected to be controlled by said control means to advance at a first speed during each selected time period and at a second speed lower than the first speed at all other times, and said second transporting means is disposed downstream of said first transporting means and is driven to advance at a speed proportional to, but higher than, the current advance speed of said first transporting means.

8. An arrangement as defined in claim 7 wherein said conveying path includes a third transporting means disposed upstream of said first transporting means for conveying items to said first transporting means.

9. An arrangement as defined in claim 8 wherein said third transporting means is arranged to convey items to said first transporting means at a speed greater than both said first speed and said second speed of advance of said first transporting means.

10. An arrangement as defined in claim 9 wherein said third transporting means is advanced at a constant speed.

* * * * *